June 1, 1965  R. A. FERRARA  3,186,763
HEADREST
Filed July 26, 1962
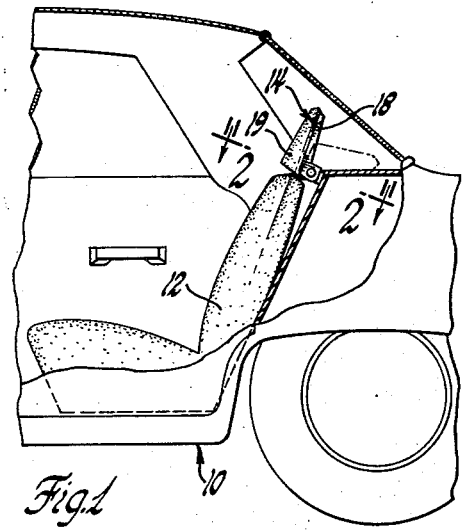
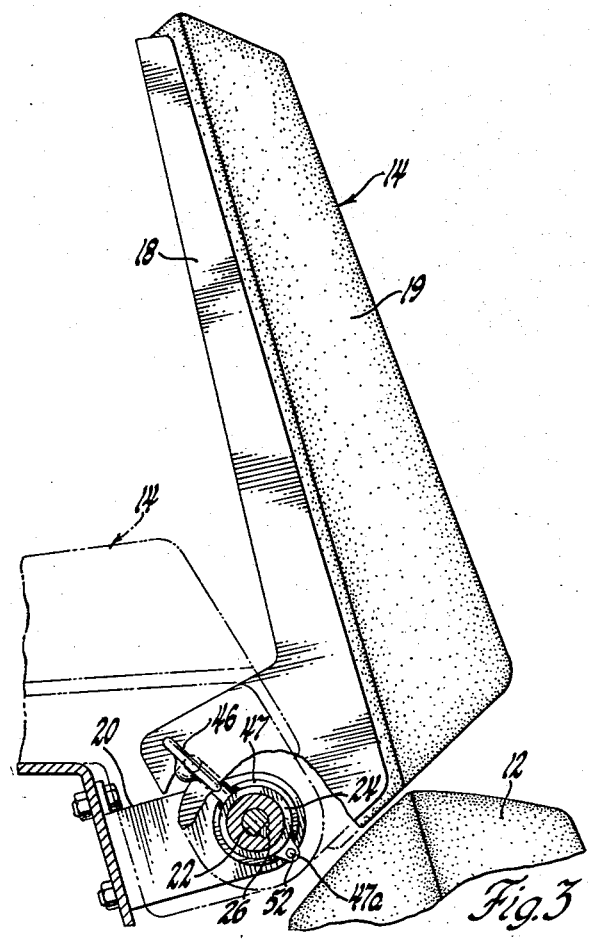
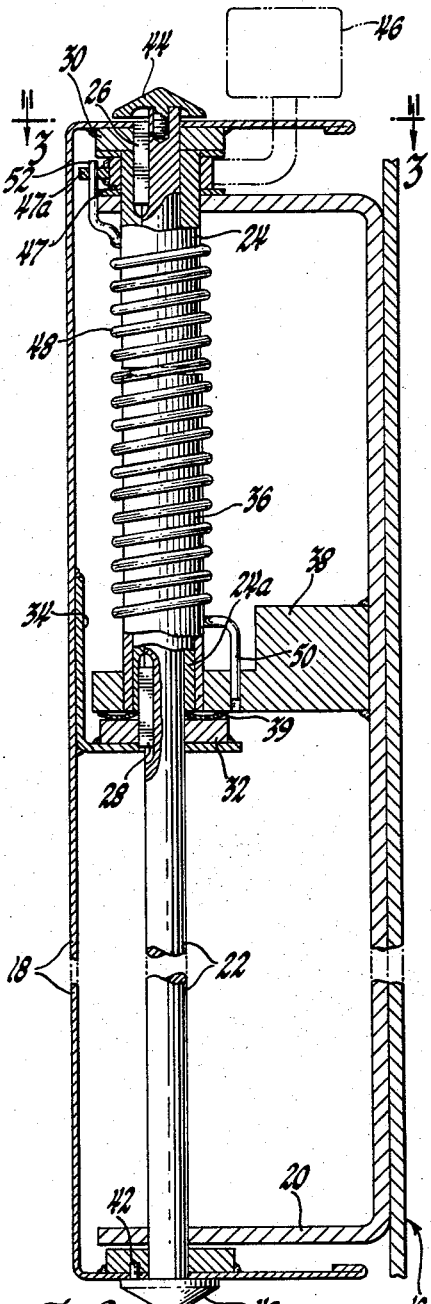
INVENTOR.
Rudolph A. Ferrara
BY
W. S. Pettigrew
ATTORNEY

United States Patent Office 3,186,763
Patented June 1, 1965

3,186,763
HEADREST
Rudolph A. Ferrara, St. Clair Shores, Mich., assignor to General Motors Corporation, Detroit, Mich., a corporation of Delaware
Filed July 26, 1962, Ser. No. 212,623
5 Claims. (Cl. 297—410)

This invention relates to headrests, and more particularly to an adjustable headrest for a vehicle seat.

It is well known to provide a vehicle seat or other seat with a headrest which is adjustable to a plurality of positions relative to the seat. The headrest is often provided to increase passenger comfort, and to lessen or prevent "whiplash" or similar injuries in the event of certain types of collisions. However, a disadvantage exists in these known headrests since a sufficient reactionary force applied to a passenger's head could flatten the cushion of the headrest to the point that his head would then impact an essentially rigid structure.

The headrest of this invention overcomes the disadvantages of previous headrests since it is movable relative to the seat under a predetermined force so that the passenger's head will not impact the frame or other rigid structure of the headrest in the event of an accident. The headrest is further freely adjustable in one direction to any selected one of an infinite number of positions but is adjustably fixed against movement in the other direction from any one of the selected positions. Additionally, manual release means are provided so that the headrest can freely move in the other direction when desired.

An object of this invention is to provide an improved adjustable headrest. Another object of this invention is to provide an improved adjustable headrest that is freely movable in one direction to any selected one of an infinite number of positions within its range of movement but is adjustably fixed against movement from any selected position in the other direction, with operating means being provided for selectively releasing the headrest for movement in the other direction.

Yet another object of this invention is to provide an improved adjustable headrest which is normally fixed against movement in one direction but which is movable in the one direction if a predetermined force is applied thereto, such as by a passenger's head in the event of an accident or otherwise.

These and other objects of the invention will be readily apparent from the following specification and drawings, wherein:

FIGURE 1 is a partially broken away view of a vehicle including a seat and a headrest according to this invention, the headrest being shown in solid lines in one position and in broken lines in another position;

FIGURE 2 is an enlarged partially broken away sectional view taken generally along the plane indicated by line 2—2 of FIGURE 1;

FIGURE 3 is a partially broken away view taken generally along the plane indicated by line 3—3 of FIGURE 2.

Referring now to FIGURE 1 of the drawings, a vehicle body 10 includes a conventional seat 12 and a headrest 14 which is mounted on the body immediately adjacent the upper edge of the seat back for adjustment to any selected one of an infinite number of positions with respect thereto. The headrest 14 generally includes a frame 18 which supports a cushion 19.

As shown in FIGURES 2 and 3, a generally U-shaped mounting bracket 20 is bolted to the body wall adjacent the seat back and a shaft 22 extends through aligned apertures in the frame 18 and the bracket 20. A sleeve member 24 surrounds an end portion of the shaft 22 and has one end thereof locked to the shaft by key 26 and the other reduced diameter end portion 24a thereof locked to the shaft by key 28, with the keys 26 and 28 also locking the shaft 22 to a pair of reinforcing members 30 and 32, respectively, member 30 being welded to the frame 18, and member 32 also being welded to a bracket 34 which is welded to frame 18. A sleeve member 36 surrounds the reduced diameter end portion 24a of the sleeve 24 and has one end thereof received within an aperture of and fixed to a collar 38 which is welded to the bracket 20. A convex cross sectional shaped spring washer 39 seats on the reinforcement member 32 and resiliently seats one end of the sleeve 24 in order to bias the other end into abutting relation with reinforcement 30. Shaft 22 is prevented from rotating with respect to frame 18 by the keys 26 and 28 and also by means of a cap 40 fixedly mounted on one end of shaft 22 and having an extending lug 42 received within an aperture in frame 18. Shaft 22 is prevented from sliding through frame 18 by a cap bolt 44 threaded into a tapped aperture in the other end of the shaft 22.

A manual operating means generally comprises a manual operating handle 46 which is secured to a collar 47 slidably and rotatably received on the sleeve 24. The collar is axially located by a pair of washers, one of which is backed up by the bracket 20 and the other of which is backed up by the reinforcing member 30. A helical spring 48 surrounds the sleeves 24 and 36, with one end 50 of the spring being anchored in an aperture in the collar 38 and the other end 52 of the spring being received within an apertured ear 47a of the collar 47 of operating means 46.

In FIGURE 1, should the headrest 14 be rotated clockwise, frame 18, shaft 22, and sleeve 24 will rotate as a unit and cause a frictional force between sleeve 24 and spring 48 in a direction causing spring 48 to wind up and tightly grip sleeves 24 and 36 and lock them together so that the headrest, which is keyed to sleeve 24, is held against further rotation in this direction. Should headrest 14 be rotated counterclockwise, frame 18, shaft 22 and sleeve 24 would rotate in the opposite direction causing the opposite effect, that is, a frictional force against spring 48 in a direction causing it to unwind and loosen from sleeve 24, thus permitting free rotation of sleeve 24 and shaft 22 within sleeve 36 and permitting headrest 14 to be freely adjusted to any selected position within its range of movement.

When a passenger desires to adjust headrest 14 from a fixed position to any selected position in a counterclockwise path, FIGURE 3, manual operating handle 46 is rotated clockwise to the position shown in FIGURE 3, to rotate collar 47 clockwise and cause spring 48 to uncoil and loosen its grip upon sleeve 24, thus allowing free rotation of sleeve 24, shaft 22, and frame 18 as a unit to any selected position of headrest 14.

When a passenger, due to a collision or otherwise, strikes headrest 14 with a predetermined force sufficient to rotate headrest 14 clockwise with respect to seat 12 through the incremental distance required to further coil and tighten the spring 48 about sleeve 24, and then to overcome the reactionary frictional moment of the tightened spring 48, spring 48 will, in effect, slip from its grip on sleeve 24 and headrest 14 will rotate clockwise with respect to seat 12, although still experiencing the reactionary moment or clutching action of tightened spring 48. The word "slip," as used herein is meant to describe what happens to a clutch when it experiences a force sufficient to override its grip, whether it be a slip clutch as herein described, a jaw clutch, or any other known gripping device. Thus, when a passenger strikes headrest 14 with a predetermined force in a direction rotating headrest 14 clockwise with respect to seat 12, FIGURE 1, headrest 14 will no longer be rigid, but will move and absorb said predetermined force during movement.

It will be understood that the headrest could just as easily be mounted directly on a seat, such as a vehicle front seat, without departing from the scope of the invention.

While I have shown and described one embodiment of my invention, it is capable of many modifications. Changes, therefore, may be made in the construction and arrangement without departing from the spirit and scope of my invention.

I claim:

1. The combination comprising, a vehicle body member, a seat member, a headrest, means mounting said headrest on one of said members for adjustment within a defined range of movement to any of an infinite number of positions with respect to said seat member, one-way clutch means operatively interconnecting said one member and said headrest and freely permitting movement of said headrest in one direction relative to said seat member to any of said positions and normally positively preventing movement of said headrest in the opposite direction relative to said seat member from any one of said positions, said clutch means being slippable without damage thereto upon the application of a predetermined force to said headrest in said opposite direction to permit movement of said headrest in said opposite direction relative to said seat member, and manually operable means for releasing said clutch means to permit movement of said headrest in said opposite direction relative to said seat member.

2. The combination recited in claim 1, wherein said clutch means includes a helical spring member surrounding said mounting means and fitting snugly thereto, one end of said spring member being connected to said one member, the other end of said spring member being operatively connected to said headrest, movement of said headrest in said one direction from any one of said selected positions uncoiling and loosening said spring member from said mounting means and permitting free movement of said headrest with respect to said seat member in said one direction, movement of said headrest in said opposite direction from any one of said selected positions coiling and tightening said spring member around said mounting means and preventing further movement of said headrest with respect to said seat member in said opposite direction.

3. The combination recited in claim 1 wherein, said mounting means includes a pair of relatively movable sleeve members, one being secured to said headrest and the other being secured to said one member, said helical spring member surrounding said sleeve members and fitting snugly thereto, one portion of said spring member releasably engaging said one sleeve member, and means for uncoiling said one portion of said spring member to release said spring member from said one sleeve member to permit said headrest member to be moved in said opposite direction.

4. The combination comprising, a vehicle body member, a seat member, a headrest, means mounting said headrest on one of said members for adjustment within a finite range of movement to any of an infinite number of positions with respect to said seat member, clutch means operatively interconnecting said one member and said headrest and being operable to positively locate said headrest in any selected one of said infinite number of positions, said clutch means freely permitting movement of said headrest from said selected position in one direction relative to said seat member to another of said positions and normally positively preventing movement of said headrest from said selected position in the opposite direction relative to said seat member, and means for releasing said clutch means to permit movement of said headrest relative to said seat member in said opposite direction.

5. The combination comprising, a vehicle body member, a seat member mounted on said body member, a headrest, means mounting said headrest on one of said members for movement relative thereto, and one-way clutch means operatively interconnecting said one member and said headrest, said clutch means normally positively holding said headrest against movement in one direction relative to said seat member and freely permitting movement of said headrest in the opposite direction relative to said seat member, said clutch means being slippable without damage thereto upon the application of a predetermined force to said headrest in said one direction to freely permit movement of said headrest in said one direction.

References Cited by the Examiner

UNITED STATES PATENTS

| 1,856,534 | 5/32 | Boery | 297—373 |
| 2,839,125 | 6/58 | Brandon | 297—396 |
| 2,973,029 | 2/61 | Schlosstein | 297—404 |

FRANK B. SHERRY, *Primary Examiner.*